US011840289B2

United States Patent
Heo

(10) Patent No.: US 11,840,289 B2
(45) Date of Patent: Dec. 12, 2023

(54) APPARATUS FOR LIMITING STEERING ANGLE IN STEER-BY-WIRE SYSTEM

(71) Applicants: Hyundai Motor Company, Seoul (KR); Kia Corporation, Seoul (KR)

(72) Inventor: Jin Hyuck Heo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 324 days.

(21) Appl. No.: 17/469,161

(22) Filed: Sep. 8, 2021

(65) Prior Publication Data

US 2022/0315095 A1    Oct. 6, 2022

(30) Foreign Application Priority Data

Mar. 30, 2021  (KR) .................. 10-2021-0041238

(51) Int. Cl.
| | |
|---|---|
| *B62D 5/00* | (2006.01) |
| *B62D 1/16* | (2006.01) |
| *G05G 5/04* | (2006.01) |

(52) U.S. Cl.
CPC .............. *B62D 5/001* (2013.01); *B62D 1/16* (2013.01); *G05G 5/04* (2013.01)

(58) Field of Classification Search
CPC ................................ B62D 5/001; B62D 1/16
See application file for complete search history.

(56) References Cited

U.S. PATENT DOCUMENTS

| | | | | | |
|---|---|---|---|---|---|
| 2,746,573 | A | * | 5/1956 | Hastings | ................... G05G 5/04 192/139 |
| 2003/0184072 | A1 | * | 10/2003 | Andonian | .............. B62D 5/001 280/779 |

FOREIGN PATENT DOCUMENTS

| | | | | |
|---|---|---|---|---|
| CN | 214240958 | U | * | 9/2021 |
| JP | 2003048550 | A | * | 2/2003 |
| JP | 2015009658 | A | * | 1/2015 |
| JP | 6115355 | B2 | * | 4/2017 |
| JP | 6167634 | | | 7/2017 |
| JP | 6421623 | | | 11/2018 |
| KR | 20090027449 | A | * | 3/2017 |

* cited by examiner

*Primary Examiner* — Daniel D Yabut
(74) *Attorney, Agent, or Firm* — MORGAN, LEWIS & BOCKIUS LLP

(57) ABSTRACT

An apparatus of limiting a steering angle in a steer-by-wire (SBW) system, may include a steering column rotating in association with a steering wheel; a striker which is provided to penetrate the steering column and rotates together with the steering column, and has a guide pin and a stopper pin; and a disk member that has a spiral sliding slot formed on a surface facing the guide pin, and a stopper formed on a position limiting a maximum steering angle of the steering column in a process of the guide pin rotating along the sliding slot and the striker being translated with respect to the steering column, so that the stopper pin is caught by the stopper in the rotation and translation motions of the striker.

8 Claims, 6 Drawing Sheets

APPARATUS FOR LIMITING STEERING ANGLE IN STEER-BY-WIRE SYSTEM

CROSS REFERENCE TO RELATED APPLICATION

The present application claims priority to Korean Patent Application No. 10-2021-0041238, filed Mar. 30, 2021, the entire contents of which is incorporated herein for all purposes by this reference.

BACKGROUND OF THE INVENTION

Field of the Invention

The present invention relates to an apparatus of limiting a steering angle in an SBW system that can prevent self-locking by limiting a maximum steering angle without increasing friction.

Description of Related Art

A steer-by-wire (SBW) system is a steering system that separates the mechanical connection between a steering wheel and a driving wheel of a vehicle. The vehicle may be steered by receiving a rotation signal of the steering wheel through an electronic control unit (ECU), and operating a steering motor connected to the driving wheel based on the input rotation signal.

This steer-by-wire system eliminates the mechanical connection structure of an existing steering system, so that there are advantages of increasing the degree of freedom of layout due to the configuration of the steering system, improving fuel economy, and eliminating disturbances input back from the wheel.

On the other hand, due to the disconnection of the mechanical connection structure, there is also a disadvantage in that the steering information required by a driver cannot be properly fed back.

In other words, in the case of the existing steering system, the steering wheel is also constrained by the rotation limit of the tire due to the mechanical connection structure using universal joints and the like. But, since the steering wheel and the tire steering system are mechanically separated in the steer-by-wire system, it needs a mechanism that constantly limits the rotation angle of the steering wheel.

As an apparatus of limiting the steering angle, there is a method of limiting the displacement of the steering wheel using a screw and a nut.

In a screw and nut structure, a nut (striker) is provided in a fixed housing, and the vertical sliding between the housing and the nut is possible, but rotation is not possible. Thus, when the steering wheel is turned, the screw rotates together, and accordingly, the striker moves up and down along the screw.

The striker moving upwards and downwards according to the steering angle is limited in displacement by a vertical stopper provided near a maximum steering angle, and accordingly, the steering angle is finally limited.

However, if the pitch of the screw is too small, friction increases, and when torque is applied after reaching the maximum steering angle, a self-locking phenomenon (locking like a screw) occurs and there is a problem that the steering wheel is locked. Conversely, if the pitch is increased, there is a disadvantage that the length of the system is lengthened.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of limiting a steering angle in an SBW system that can limit a maximum steering angle without increasing friction and prevent a self-locking phenomenon.

To achieve the above purposes, the present invention may include a steering column rotating in association with a steering wheel; a striker which is provided to penetrate the steering column in a radial direction of the steering column and rotates together with the steering column, and has a guide pin and a stopper pin formed at an end portion of the striker; and a disk member that has a spiral sliding slot formed on a surface facing the guide pin, and a stopper formed on a position limiting a maximum steering angle of the steering column among rotation paths of the stopper pin in the rotation of the steering column in which the guide pin is rotated along the sliding slot so that the striker is translated with respect to the steering column, so that the stopper pin is caught by the stopper in the rotation and translation motions of the striker.

A column slot may be formed in a radial direction of the steering column; and the striker may be penetrated through the column slot and translated along the column slot.

A bearing may be provided on an internal surface of the column slot.

The disk member may be provided in a form in which a guide disk and a stopper disk overlap vertically and fixed in a shape surrounding the steering column; and the striker may be rotated and translated in a horizontal direction between the guide disk and the stopper disk.

The spiral sliding slot may be formed on an internal surface of the guide disk around an axis of the steering column; and the guide pin may be formed to protrude from one surface of the striker facing the guide disk to be guided along the sliding slot.

Only one guide pin may be formed on one side of the striker.

The stopper may be formed to protrude from an internal surface of the stopper disk facing the sliding slot; and the stopper pin may be formed to protrude from the other surface of the striker facing the stopper disk so that the stopper pin may be caught by the stopper in the rotation of the striker.

The stopper pins may be formed at both end portions of the striker, respectively; and the stoppers may be respectively formed on both sides based on an axis of the steering column.

According to the above-described means for solving the problem, the present invention can physically block a rotation path of a stopper pin formed on a striker on a vertical surface by a stopper formed on a disk member and prevent the rotation of the stopper pin. Thus, friction is not increased even when a steering angle is increased, and there is an effect of blocking the self-locking phenomenon caused by pinching between parts.

Furthermore, as an apparatus is configured so that the striker rotates and moves in a horizontal direction within the disk member, the vertical length of the apparatus can be designed to be short, so it is not only excellent in terms of package, but also advantageous in terms of durability as the striker is operated within the disk member.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
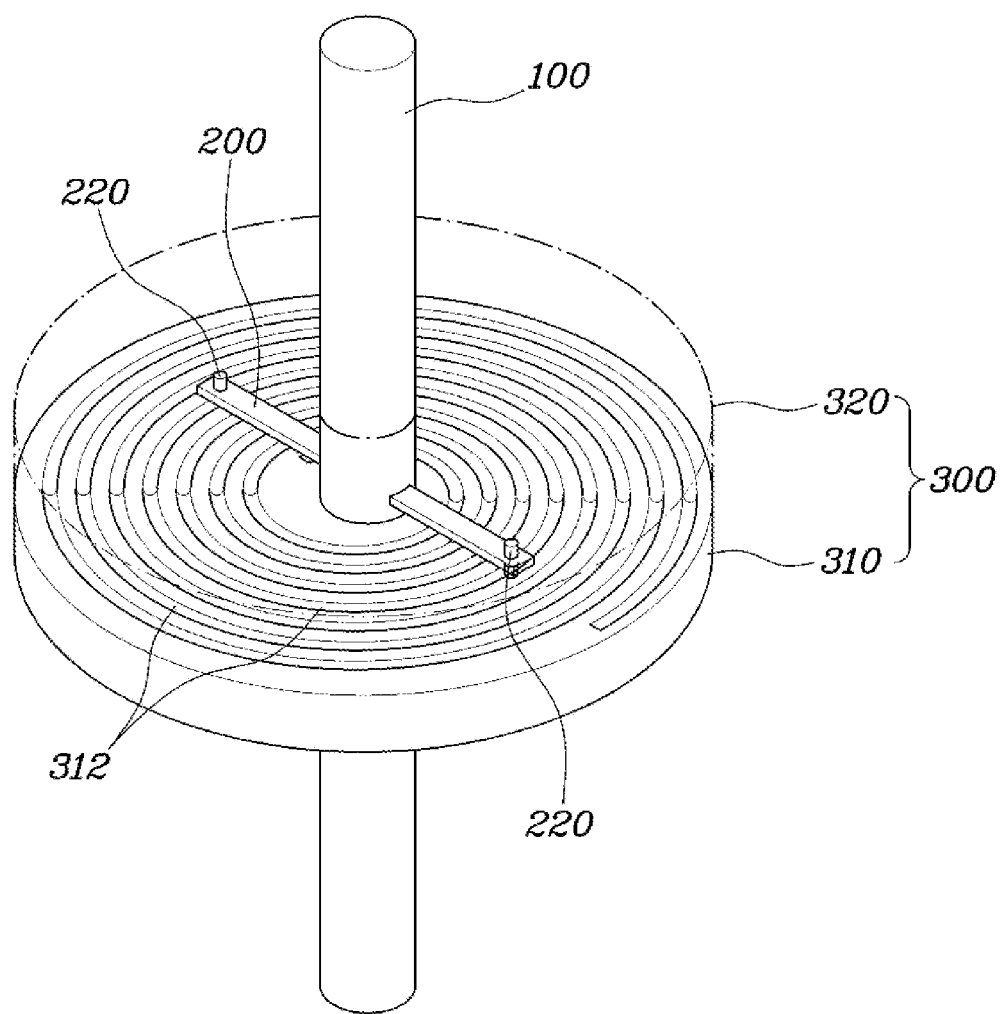
FIG. 1 is a view showing a projection of the interior of an apparatus of limiting a steering angle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The exemplary embodiments of the present invention will be described in detail with reference to the accompanying drawings.

FIG. 1 is a view showing a projection of the interior of an apparatus of limiting a steering angle in a steer-by-wire (SBW) system according to various exemplary embodiments of the present invention.

Referring to the drawings, the present invention includes a steering column 100 that rotates in association with a steering wheel; a striker 200 which is provided to penetrate the steering column 100 in a radial direction and rotates together with the steering column 100, and has a guide pin 210 and a stopper pin 220 formed at an end portion thereof; and a disk member 300 that has a spiral sliding slot 312 formed on a surface facing the guide pin 210, and a stopper 322 formed on a position limiting a maximum steering angle of the steering column 100 among rotation paths of the stopper pin 220 in a process of the rotation of the steering column 100 in which the guide pin 210 is rotated along the sliding slot 312 so that the striker 200 is translated with respect to the steering column 100, so that the stopper pin 220 is caught by the stopper 322 in a process of the rotation and translation motions of the striker 200.

A steering wheel is coupled to an upper end portion of the steering column 100 so that the steering column 100 rotates together with the steering rotation of the steering wheel. Furthermore, a reaction force motor is provided at a lower end portion of the steering column 100 to provide a steering reaction force to the steering wheel.

The striker 200 is formed in a thin and long stick shape, and is provided by penetrating through the middle portion of the steering column 100 in a radial direction thereof, and thus rotates together with the steering column 100 when the steering column 100 is rotated.

Furthermore, the guide pin 210 is formed on the striker 200, and the spiral sliding slot 312 is formed in the disk member 300 facing the guide pin 210, so that the guide pin 210 is guided and moved while being inserted into the sliding slot 312.

As the guide pin 210 is guided along the spiral sliding slot 312, the distance between the axis of the steering column 100 and the guide pin 210 gradually increases or becomes closer in proportion to the rotation of the steering column 100. Accordingly, the striker 200 is translated in the radial direction of the steering column 100.

Furthermore, the stopper pin 220 is formed on the striker 200, and the stopper 322 is formed at a position of the disk member 300 in which the maximum steering angle is to be limited, so that in a process of rotation and translation of the striker 200 the stopper pin 220 formed on the striker 200 is caught by the stopper 322.

That is, at the same time the striker 200 is rotated, the striker 200 is linearly moved in one direction in proportion to the rotation of the striker 200, so that it is caught by the stopper 322 located in the rotation path of the stopper pin 220 in a process of continuously steering the steering wheel to the left or right. Accordingly, the maximum steering angle of the steering wheel is mechanically limited.

Therefore, by adding a simple structure to the steering column 100, an end-lock function that limits the maximum steering angle is effectively implemented, since the stopper 322 physically blocks the rotation path of the stopper pin 220 on a vertical surface and prevents the rotation of the stopper pin 220, friction does not increase even when the steering angle is increased, and thus self-locking phenomenon caused by pinching between parts is fundamentally blocked.

Figure 2:
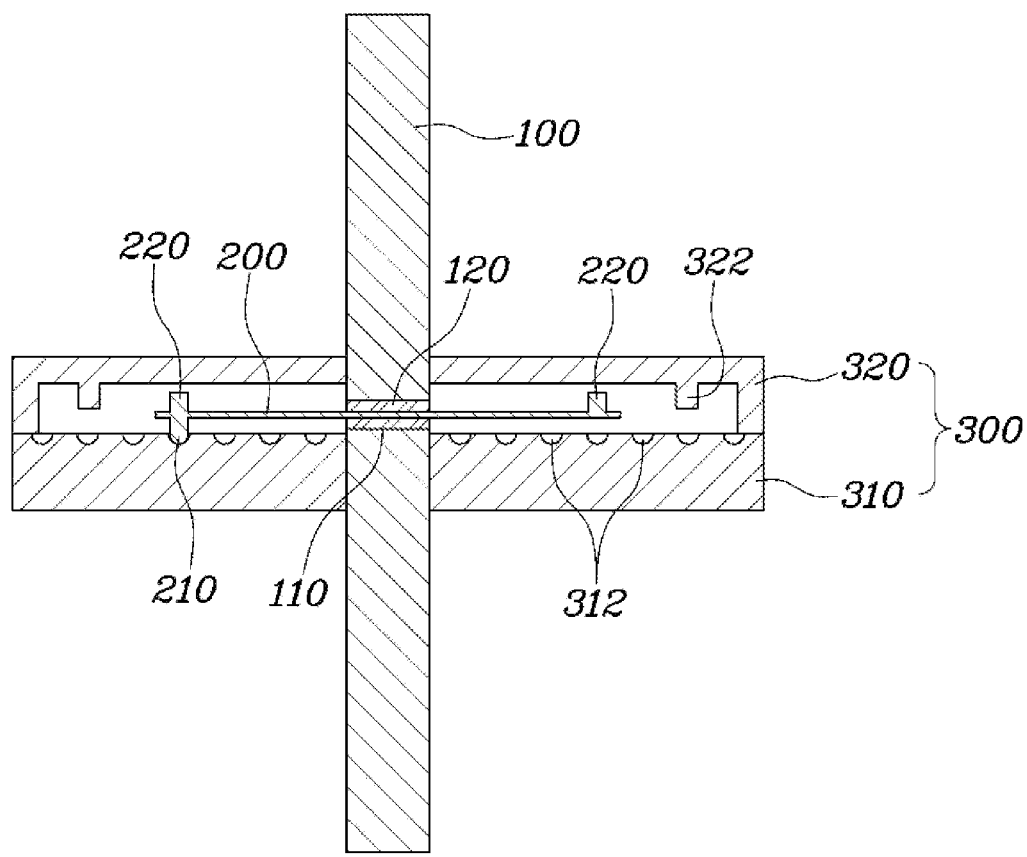
FIG. 2 is a cross-sectional view of an apparatus of limiting a steering angle according to various exemplary embodiments of the present invention.
Figure 3:
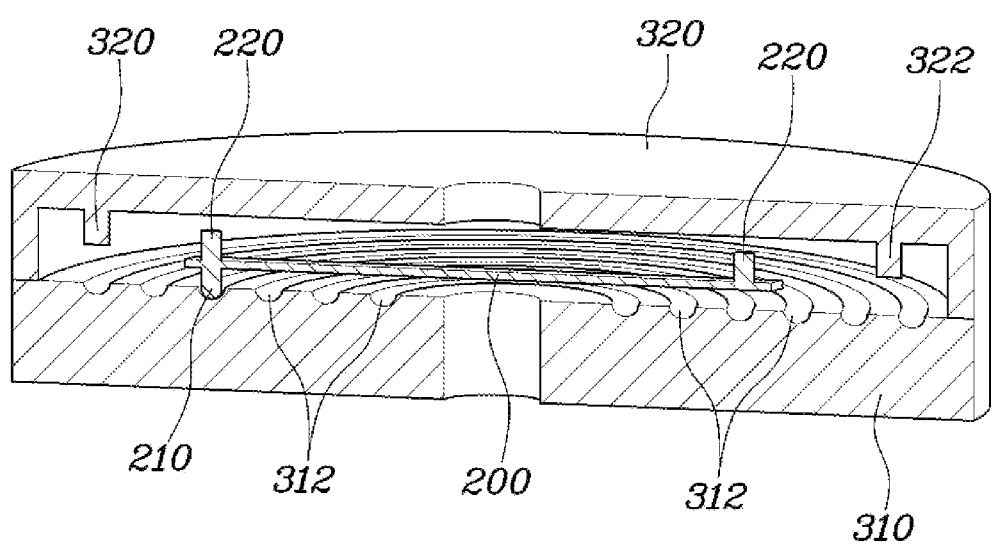
FIG. 3 is a three-dimensional view showing the cross-sectional structure of a disk member and a striker according to various exemplary embodiments of the present invention.
Figure 4:
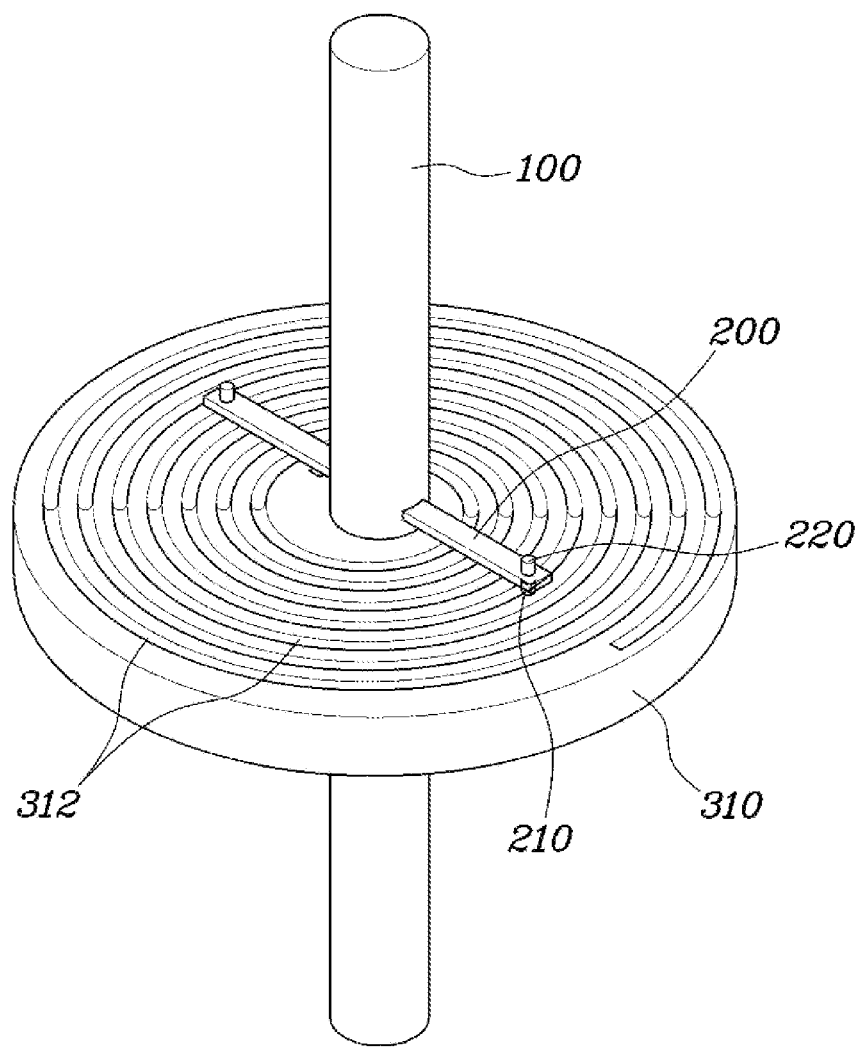
FIG. 4 is a perspective view of a guide disk provided with a striker according to various exemplary embodiments of the present invention.

Furthermore, FIG. 2 is a cross-sectional view of an apparatus of limiting a steering angle according to various exemplary embodiments of the present invention, and FIG. 4 is a perspective view of a guide disk 310 provided with the striker 200 according to various exemplary embodiments of the present invention.

Referring to the drawings, a column slot 110 is formed in the radial direction of the steering column 100; and the striker 200 is penetrated through the column slot 110 to be translated along the column slot 110.

Furthermore, a bearing 120 may be provided on the internal surface of the column slot 110.

That is, by forming the column slot 110 through which the striker 200 is provided to penetrate in the radial direction based on the axis of the steering column 100, the striker 200 is translated in the radial direction along the column slot 110.

In the present way, as the striker 200 is translated relative to the steering column 100, a bearing 120 structure for preventing play and minimizing friction may be mounted on the internal surface of the column slot 110. Therefore, it is possible to minimize the occurrence of mechanical friction due to the translational movement of the striker 200 during steering of the steering wheel.

Meanwhile, referring to FIG. 2, in various exemplary embodiments of the present invention, the disk member 300 is provided in a shape in which the guide disk 310 and a stopper disk 320 overlap vertically, and is fixed in a shape surrounding the steering column 100; and the striker 200 is rotated and translated in a horizontal direction between the guide disk 310 and the stopper disk 320.

That is, when the steering column 100 is rotated, the striker 200 is rotated and moved only in the horizontal direction along the sliding slot 312 and the column slot 110, and the disk member 300 is also fixed to a vehicle body and not moved. Therefore, the upper and lower lengths of the apparatus may be designed to be very short, and thus there is a very excellent advantage in terms of a package, as well as an advantage in terms of durability because the striker 200 is operated within the disk member 300.

FIG. 4 is a perspective view of the guide disk 310 provided with the striker 200 according to various exemplary embodiments of the present invention.

Referring to FIGS. 2 and 4, the spiral sliding slot 312 is formed on the internal surface of the guide disk 310 based on the axis of the steering column 100; and the guide pin 210 is formed to protrude from one surface of the striker 200 facing the guide disk 310 so that the guide pin 210 is guided along the sliding slot 312.

The guide pin 210 is formed to protrude from the bottom surface of the end portion of the striker 200, and a portion of the lower end portion of the guide pin 210 is inserted into the sliding slot 312.

That is, as the guide pin 210 is guided along the spiral sliding slot 312, the distance between the axis of the steering column 100 and the guide pin 210 gradually increases or becomes closer in proportion to the rotation of the steering column 100.

For example, each time the striker 200 rotating together with the steering column 100 rotates by 180°, the striker 200 may be designed to move in translation by one pitch of the sliding slot 312.

Accordingly, the maximum steering angle may be implemented at various angles according to the design of the pitch of the sliding slot 312 and the positions of the stopper 322 and the stopper pin 220 to be described later.

Furthermore, only one guide pin 210 may be formed on one surface of the striker 200.

That is, it is sufficient that the guide pin 210 induces the movement of the striker 200 while rotating along the sliding slot 312 when the steering column 100 is rotated, so only one guide pin 210 may be formed to minimize the friction between the guide disk 310 and the guide pin 210 and to stably translate the striker 200.

Figure 5:
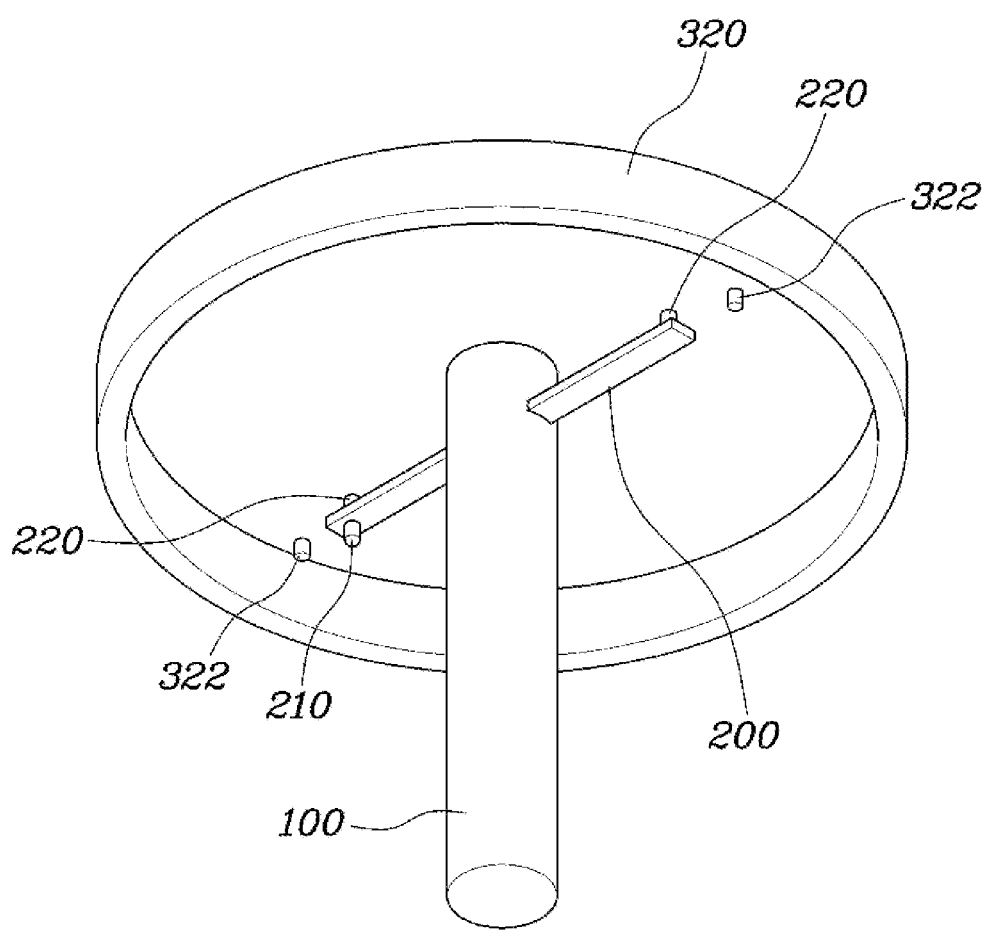
FIG. 5 is a bottom perspective view of a stopper disk provided with a striker according to various exemplary embodiments of the present invention.

FIG. 5 is a perspective view of a bottom surface of the stopper disk 320 provided with the striker 200 according to various exemplary embodiments of the present invention.

Referring to FIGS. 2 and 5, the stopper 322 is formed to protrude on the internal surface of the stopper disk 320 facing the sliding slot 312; and the stopper pin 220 is formed to protrude from the other surface of the striker 200 facing the stopper disk 320 so that the stopper pin 220 is caught by the stopper 322 during the rotation of the striker 200.

Furthermore, the stopper pins 220 may be formed at both end portions of the striker 200, respectively; and the stoppers 322 may be respectively formed on both sides based on the axis of the steering column 100.

For example, the stopper pins 220 are formed to protrude from the upper surfaces of both end portions of the striker 200, and the stoppers 322 are formed to protrude from both sides of the bottom surface of the stopper disk 320, respectively.

In the instant case, the stopper 322 may be formed to be symmetrical at intervals of 180° based on the axis of the steering column 100, and is formed on a path in which the stopper pin 220 rotates.

Figure 6:
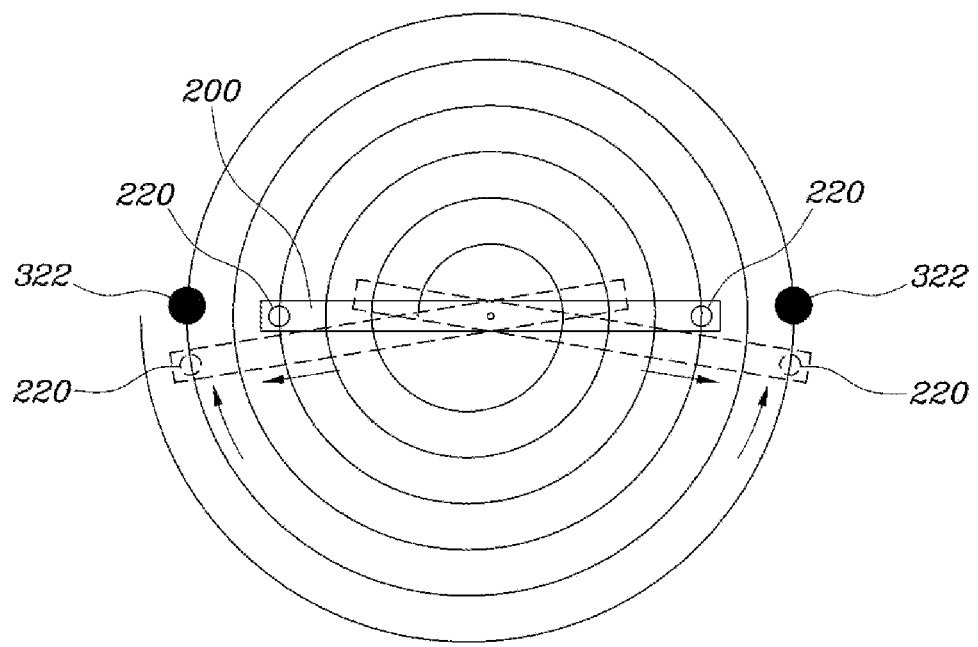
FIG. 6 is a view for explaining a steering angle limiting action according to the rotation and translation motions of the striker according to various exemplary embodiments of the present invention.

FIG. 6 is a view for explaining a steering angle limiting action according to the rotation and translation motions of the striker 200 according to various exemplary embodiments of the present invention.

Examining the operation of limiting the steering angle with reference to the drawings, the striker 200 is rotated counterclockwise when the steering wheel is steered by turning left.

Accordingly, the guide pin 210 is rotated along the spiral sliding slot 312, and in proportion to the rotation of the guide pin 210, the striker 200 is gradually translated in the radial direction of one side of the column slot 110.

According to such rotation and translation motions, the stopper pin 220 formed at one end portion of the striker 200 is caught by the stopper 322 on the right side, limiting the maximum steering angle in the left turning direction thereof.

On the other hand, during the right turn steering of the steering wheel, the striker 200 rotates clockwise as opposed to the left turn.

Accordingly, the guide pin 210 is rotated along the spiral sliding slot 312, and in proportion to the rotation of the guide pin 210, the striker 200 is gradually translated in the other diameter direction of the column slot 110.

According to such rotation and translation motions, the stopper pin 220 formed at the other end portion of the striker 200 is caught by the stopper 322 on the left, limiting the maximum steering angle in the right turning direction thereof.

As described above, in various exemplary embodiments of the present invention, the stopper 322 formed on the disk member 300 physically blocks the rotation path of the stopper pin 220 formed on the striker 200 on a vertical surface to prevent the rotation of the stopper pin 220. As a result, friction does not increase even when the steering angle is increased, blocking the self-locking phenomenon caused by pinching between parts.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of limiting a steering angle in a steer-by-wire (SBW) system, the apparatus comprising:
    a steering column rotating in association with a steering wheel;
    a striker provided to penetrate the steering column in a radial direction of the steering column and to rotate together with the steering column, wherein the striker includes a guide pin and a stopper pin formed at an end portion of the striker; and
    a disk member which is fixed to a stationary member, wherein the disk member includes:
        a spiral sliding slot formed on a surface of the disk member facing the guide pin; and
        a stopper formed on a position limiting a maximum steering angle of the steering column among rotation paths of the stopper pin in the rotation of the steering column, wherein the guide pin is rotated along the spiral sliding slot so that the striker is translated with respect to the steering column and the stopper pin is selectively caught by the stopper in the rotation and translation motions of the striker.

2. The apparatus of claim 1,
wherein a column slot is formed in the steering column in a radial direction of the steering column, and
wherein the striker is penetrated through the column slot and is translatable along the column slot.

3. The apparatus of claim 2,
wherein a bearing is provided on an internal surface of the column slot and
wherein the striker is slidably mounted on the bearing.

4. The apparatus of claim 1,
wherein the disk member includes a guide disk and a stopper disk that overlap vertically and are fixed to each other to slidably surround the steering column, and
wherein the striker is rotated and translated in the radial direction of the steering column between the guide disk and the stopper disk in accordance with rotation of the steering column.

5. The apparatus of claim 4,
wherein the spiral sliding slot is formed on an internal surface of the guide disk around an axis of the steering column, and
wherein the guide pin protrudes from a first surface of the striker facing the guide disk and engaged to the spiral sliding slot to be guided along the spiral sliding slot.

6. The apparatus of claim 5, wherein the guide pin is single and formed on the first surface of the striker.

7. The apparatus of claim 4,
wherein the stopper protrudes from an internal surface of the stopper disk facing the spiral sliding slot, and
wherein the stopper pin protrudes from a second surface of the striker facing the stopper disk so that the stopper pin is selectively caught by the stopper in the rotation of the striker.

8. The apparatus of claim 7,
wherein the stopper pin is formed in plural and positioned at first and second end portions of the striker, respectively, and
wherein the stopper is formed in plural and positioned respectively on first and second sides of the internal surface of the stopper disk based on an axis of the steering column.

* * * * *